(12) United States Patent
Yang et al.

(10) Patent No.: US 11,491,519 B2
(45) Date of Patent: Nov. 8, 2022

(54) AUTOMATIC DIE CLEANING DEVICE WITH REUSABLE CLEANING FLUID

(71) Applicant: CITIC Dicastal Co., Ltd., Qinhuangdao (CN)

(72) Inventors: Jinling Yang, Qinhuangdao (CN); Xiaoting Zhu, Qinhuangdao (CN); Weizhou Liu, Qinhuangdao (CN); Hongshen Zhang, Qinhuangdao (CN); Yukun Yang, Qinhuangdao (CN); Yingfeng Wang, Qinhuangdao (CN); Zhen Wang, Qinhuangdao (CN); Li Yang, Qinhuangdao (CN)

(73) Assignee: CITIC Dicastal Co., Ltd., Ginhuangdao (CN)

( * ) Notice: Subject to any disclaimer, the term of this patent is extended or adjusted under 35 U.S.C. 154(b) by 375 days.

(21) Appl. No.: 16/666,341

(22) Filed: Oct. 28, 2019

(65) Prior Publication Data
US 2020/0331041 A1    Oct. 22, 2020

(30) Foreign Application Priority Data
Apr. 22, 2019    (CN) .......................... 201910322566.9

(51) Int. Cl.
*B08B 9/093*    (2006.01)
*B25J 15/00*    (2006.01)
(Continued)

(52) U.S. Cl.
CPC .......... *B08B 9/0936* (2013.01); *B01D 33/048* (2013.01); *B01D 33/44* (2013.01);
(Continued)

(58) Field of Classification Search
CPC .... B08B 3/024; B08B 9/0821; B25J 11/0085; B25J 9/046; B25J 15/026; B25J 15/0253;
(Continued)

(56) References Cited

U.S. PATENT DOCUMENTS 1,897,067 A * 2/1933 Miller ....................... B60P 1/12
                                                      298/13
4,170,240 A * 10/1979 Gentry ..................... B08B 3/02
                                                      134/104.4
(Continued)

FOREIGN PATENT DOCUMENTS

JP            4203298 B2 * 12/2008

*Primary Examiner* — Joseph L. Perrin
*Assistant Examiner* — Irina Graf
(74) *Attorney, Agent, or Firm* — IPRO, PLLC

(57) ABSTRACT

Disclosed is an automatic die cleaning device with reusable cleaning fluid. The automatic die cleaning device includes a robot, a cleaning fluid cyclic-spraying system and a die overturning mechanism. The automatic die cleaning device can spray the cleaning fluid to a die to clean oil stains off the surface of the wheel die, thus realizing the function of automatically cleaning the oil stains off the surface of the die; and the automatic die cleaning device also has the function of reusing the cleaning fluid, thereby saving the cleaning fluid and reducing the influence on the environment. The cleaned die surface is smooth, and the effect is ideal. The automatic die cleaning device reduces the labor intensity, meets the requirement of high-efficiency production, and improves the production efficiency.

9 Claims, 3 Drawing Sheets

(51) Int. Cl.
  *B01D 33/04*   (2006.01)
  *B08B 9/08*    (2006.01)
  *B25J 11/00*   (2006.01)
  *B01D 33/048*  (2006.01)
  *B01D 33/44*   (2006.01)

(52) U.S. Cl.
  CPC ......... *B08B 9/0821* (2013.01); *B25J 11/0085* (2013.01); *B25J 15/0028* (2013.01); *B08B 2203/007* (2013.01)

(58) Field of Classification Search
  CPC ..... B25J 15/0028; B25J 11/00; B01D 33/048; B01D 33/056; B01D 33/44
  See application file for complete search history.

(56) References Cited

U.S. PATENT DOCUMENTS

| | | | | |
|---|---|---|---|---|
| 4,365,383 A | * | 12/1982 | Bartlett | F16K 11/056 15/302 |
| 4,443,269 A | * | 4/1984 | Capella | B08B 3/006 134/12 |
| 4,629,409 A | * | 12/1986 | Satoh | B29C 33/72 414/732 |
| 4,768,533 A | * | 9/1988 | Hall | B08B 3/02 134/111 |
| 5,277,208 A | * | 1/1994 | Mansur | B08B 3/02 134/107 |
| 6,257,254 B1 | * | 7/2001 | Rochette | B08B 3/02 134/105 |
| 6,804,579 B1 | * | 10/2004 | Laski | B08B 3/024 318/568.11 |
| 2002/0088746 A1 | * | 7/2002 | Rohrbacher | B01D 33/461 210/396 |
| 2003/0146174 A1 | * | 8/2003 | Hansen | B01D 33/50 210/770 |
| 2006/0037635 A1 | * | 2/2006 | Rhodes | B08B 3/02 134/200 |
| 2008/0135065 A1 | * | 6/2008 | Yao | B08B 11/00 134/18 |
| 2008/0230089 A1 | * | 9/2008 | Young | B08B 3/044 134/2 |
| 2009/0283119 A1 | * | 11/2009 | Moussa | B29C 71/04 134/57 R |
| 2012/0006363 A1 | * | 1/2012 | Milojevic | F16D 1/02 134/62 |
| 2012/0080060 A1 | * | 4/2012 | Haremaki | B08B 3/02 134/70 |
| 2013/0220371 A1 | * | 8/2013 | David | G01N 35/0099 134/10 |
| 2018/0043403 A1 | * | 2/2018 | Zippel | B25J 11/0085 |

* cited by examiner

AUTOMATIC DIE CLEANING DEVICE WITH REUSABLE CLEANING FLUID

FIELD

The disclosure relates to the technical field of die cleaning, in particular to an automatic die cleaning device with reusable cleaning fluid.

BACKGROUND

During the use of a forged wheel hub die, whether in manual production or automatic production, it is necessary to spray oil-based graphite lubricant on the surface of a forged product forming die, which allows the effective flow of product materials, so as to obtain forged products. However, the surface of the forged product forming die may be stained with oil-based graphite lubricant during production. The oil-based graphite lubricant has the characteristics of large viscosity, strong adhesion and high cleaning difficulty on a forming surface of the metal die. In addition, due to the uneven upper and lower die surfaces, manual cleaning may not be able to ensure complete cleanness. Besides, manual cleaning involves high labor intensity, is time-consuming and labor-consuming, and is low in efficiency, thus becoming the bottleneck of efficiency improvement in production and also becoming the factor affecting the production efficiency. Further, manual cleaning takes a long time, the waste of cleaning fluid is serious, and the cleaning fluid cannot be reused, resulting in waste and environmental hazards.

SUMMARY

The embodiment of the disclosure provides an automatic die cleaning device with reusable cleaning fluid, which can solve the problems of the prior art. The automatic die cleaning device can spray the cleaning fluid to a die to clean oil stains off the surface of the wheel die, thus realizing the function of automatically cleaning the oil stains off the surface of the die; and the automatic die cleaning device also has the function of reusing the cleaning fluid, thereby saving the cleaning fluid and reducing the influence on the environment. The cleaned die surface is smooth, and the effect is ideal. The automatic die cleaning device reduces the labor intensity, meets the requirement of high-efficiency production, and improves the production efficiency.

In order to achieve the above purpose, the disclosure provides the following technical solution: in the first aspect of the present invention provides an automatic die cleaning device, comprising a robot, a cleaning fluid cyclic-spraying system and a die overturning mechanism, wherein: the robot comprises a robot arm, and the motion track of the robot arm can be controlled by programming; the cleaning fluid cyclic-spraying system comprises a cleaning fluid nozzle, a cleaning fluid delivery system, a cleaning fluid collection device and a cleaning fluid filtration device, wherein the cleaning fluid nozzle is fixed at the front end of the robot arm and moves along with the movement of the robot arm, the cleaning fluid collection device and the cleaning fluid filtration device are arranged below the die, and the cleaning fluid for flushing the die is collected by the cleaning fluid collection device and filtered by the cleaning fluid filtration device and then is re-conveyed to the cleaning fluid nozzle through the cleaning fluid delivery system to be sprayed onto the surface of the die; and the die overturning mechanism is positioned on the cleaning fluid collection device, the die is fixed on the die overturning mechanism, and the die overturning mechanism can drive the die to be freely overturned by 360° and fix the die with the top surface or the bottom surface facing upwards.

In some embodiments, wherein: the robot arm drives the cleaning fluid nozzle to move outwards from the center of the die circle by circle, the motion track is multiple concentric circles, and the radii of the circles from inside to outside gradually increase; or the robot arm drives the cleaning fluid nozzle to clean the die along the pitch radius of the die from the circle center to the edge, and then from the edge to the circle center a certain equal angle away, the circle is divided into N areas, the equal angle is 360°/N, and N is a positive integer greater than or equal to 2.

In some embodiments, wherein: the cleaning fluid delivery system comprises a cleaning fluid delivery pipeline, a pipeline support, a first high-pressure water pump, a cleaning fluid heating device, a second high-pressure water pump and a plurality of clamps, wherein the cleaning fluid filtration device is connected with the first high-pressure water pump through the cleaning fluid delivery pipeline, and the first high-pressure water pump is connected with an input port of the cleaning fluid heating device through the cleaning fluid delivery pipeline; and an output port of the cleaning fluid heating device is connected with the second high-pressure water pump through the cleaning fluid delivery pipeline, the second high-pressure water pump is connected with the cleaning fluid nozzle through the cleaning fluid delivery pipeline, and the cleaning fluid delivery pipeline is fixed to the pipeline support and the robot arm through the plurality of clamps.

In some embodiments, wherein: the cleaning fluid heating device is further provided with a second input port, and the second input port is connected with a cleaning fluid supply pipeline which continuously supplies the cleaning fluid to the cleaning fluid delivery system. Since the cleaning fluid is consumed in the cleaning process, supply input is added here to ensure that the amount of cleaning fluid is sufficient and the cleaning effect is stable.

In some embodiments, wherein: the cleaning fluid collection device comprises a collection funnel, the upper end of the collection funnel is positioned below the die, the lower end of the collection funnel is positioned on the cleaning fluid filtration device, and the upper end of the collection funnel has a large diameter and the lower end has a small diameter. A collection funnel plays a role in fluid collecting and can collect waste fluid generated by cleaning as much as possible, thus reusing the cleaning fluid.

In some embodiments, wherein: the cleaning fluid filtration device comprises a driving roller, a driven roller, a steel wire screen, a deceleration motor and a cleaning fluid collection box, wherein the cleaning fluid collection box is positioned below the cleaning fluid collection device, and the upper surface of the cleaning fluid collection box is fixedly provided with the deceleration motor, the driving roller and the driven roller; the driving roller and the driven roller are respectively positioned on the left and right sides of the lower end of the cleaning fluid collection device, the driving roller is connected with an output shaft of the deceleration motor, and a circle of steel wire screen is wound around the driving roller and the driven roller; and the driving roller drives the driven roller to rotate through the steel wire screen, the area of the upper-layer steel wire screen is larger than the area of a lower-end opening of the cleaning fluid collection device, and the lower end of the cleaning fluid collection box is provided with an outlet which is connected with the cleaning fluid delivery pipeline. The filtration device is provided with a rotatable filter screen, which can automatically output dirt filtered out on the filter screen, thus avoiding frequent manual replacement of the filter screen and improving the labor efficiency.

In some embodiments, wherein: the cleaning fluid filtration device further comprises a dirt lifting device and a dirt collection box, the driven roller is close to an edge of one side of the cleaning fluid collection box, and the dirt lifting device and the dirt collection box are arranged outside the side, provided with the driven roller, of the cleaning fluid collection box; the dirt lifting device comprises a conveyor belt, a conveyance driving motor, a belt, a driving wheel and a plurality of driven wheels, one end of the conveyor belt is positioned below the driven roller, outside the cleaning fluid collection box, and the other end of the conveyor belt is positioned at the upper end of the dirt collection box; the driving wheel is arranged in the end, located at the upper end of the dirt collection box, of the conveyor belt, and the plurality of driven wheels are arranged in the conveyor belt; and the conveyance driving motor drives the driving wheel to rotate through the belt, the driving wheel drives the conveyor belt to move and drives the driven wheels to rotate, and dirt filtered out on the steel wire screen is conveyed into the dirt collection box through the conveyor belt. The dirt collection device is arranged to facilitate centralized treatment of dirt and avoid environmental pollution caused by improper treatment.

In some embodiments, wherein: a filter screen is further arranged in the cleaning fluid collection box, and the filter screen is positioned at the side, close to the outlet, in the cleaning fluid collection box and is positioned outside the region of the lower-end opening of the cleaning fluid collection device; and the cleaning fluid filtration device further comprises a dirt lifting device and a dirt collection box, the driven roller is close to the edge of one side of the cleaning fluid collection box, and the dirt lifting device and the dirt collection box are arranged outside the side, provided with the driven roller, of the cleaning fluid collection box; the dirt lifting device comprises a conveyor belt, a conveyance driving motor, a belt, a driving wheel and a plurality of driven wheels, one end of the conveyor belt is positioned below the driven roller, outside the cleaning fluid collection box, and the other end of the conveyor belt is positioned at the upper end of the dirt collection box; the driving wheel is arranged in the end, located at the upper end of the dirt collection box, of the conveyor belt, and the plurality of driven wheels are arranged in the conveyor belt; and the conveyance driving motor drives the driving wheel to rotate through the belt, the driving wheel drives the conveyor belt to move and drives the driven wheels to rotate, and dirt filtered out on the steel wire screen is conveyed into the dirt collection box through the conveyor belt. A filter screen is arranged in a cleaning fluid collection box for secondary filtration, so that the cleaning fluid flowing into a cleaning fluid delivery system is cleaner and the cleaning effect is better.

In some embodiments, wherein: the die overturning mechanism comprises a main frame, a right movable plate, a right slide block, a left fixed plate, a horizontal push-pull component, a guide rail, a motor support, a rotating motor, a speed reducer, a coupling, a left rotating shaft, a right rotating shaft and bearings, wherein the main frame is fixed on the ground, the upper end of the main frame has no top surface, and the left fixed plate is fixed to the left side of the main frame; the guide rail perpendicular to the left fixed plate is fixedly arranged on the main frame, the bottom of the left fixed plate is also fixedly provided with the horizontal push-pull component parallel to the guide rail, one end of the horizontal push-pull component is fixed to the left fixed plate, and the other end of the horizontal push-pull component is fixed to the right slide block; the right slide block can freely slide along the guide rail under the push-pull action of the horizontal push-pull component, the right movable plate parallel to the left fixed plate is fixedly arranged on the right slide block, and the right movable plate can move left and right along with the right slide block; the motor support is arranged on the outer side face of the left fixed plate, the rotating motor is fixed to the motor support, and an output shaft of the rotating motor is connected with the speed reducer; the speed reducer is connected with the coupling, and the coupling is connected with the left rotating shaft; the left fixed plate is provided with a left through hole in the position corresponding to the left rotating shaft, a bearing is fixedly arranged in the left through hole, and the left rotating shaft passes through the left fixed plate and is fixed to an inner ring of the bearing; and the right movable plate is provided with a right through hole in the position corresponding to the left through hole, a bearing is also fixedly arranged in the right through hole, and the right rotating shaft passes through the right movable plate and is fixed to an inner ring of the bearing. The die overturning mechanism is arranged, so that the die can be overturned freely, overturning by manpower is avoided, the labor intensity is reduced, the automation degree is high, and the labor efficiency is improved. In addition, a right slide block can freely slide along a guide rail under the push-pull action of a horizontal push-pull component, and can clamp forged wheel hub dies of different sizes according to sliding distances, so that a left rotating shaft and a right rotating shaft can clamp different dies for realizing cleaning of dies of different sizes.

Compared with the prior art, the disclosure has the following beneficial effects:

The disclosure provides an automatic die cleaning device with reusable cleaning fluid. The automatic die cleaning device with reusable cleaning fluid comprises a robot, a cleaning fluid cyclic-spraying system and a die overturning mechanism. The automatic die cleaning device can spray the cleaning fluid to a die to clean oil stains off the surface of the wheel die, thus realizing the function of automatically cleaning the oil stains off the surface of the die; and the automatic die cleaning device also has the function of reusing the cleaning fluid, thereby saving the cleaning fluid and reducing the influence on the environment. The cleaned die surface is smooth, and the effect is ideal. The automatic die cleaning device reduces the labor intensity, meets the requirement of high-efficiency production, and improves the production efficiency.

BRIEF DESCRIPTION OF THE DRAWINGS

In order to more clearly explain the technical solution in the embodiments of the application, drawings which require to be used in description of the embodiments are simply introduced below, obviously, the drawings in description below are some embodiments of the application, and those having ordinary skill in the art can further acquire other drawings without creative efforts according to those drawings.

wherein 1- robot, 2- robot arm, 3- cleaning fluid delivery pipeline, 4- pipeline support, 5- first high-pressure water pump, 6- cleaning fluid heating device, 7- second high-pressure water pump, 8- clamp, 9- cleaning fluid supply pipeline, 10- collection funnel, 11- driving roller, 12- driven roller, 13- steel wire screen, 14- filter screen, 15-deceleration motor, 16- cleaning fluid collection box, 17- outlet, 18- dirt lifting device, 19- dirt collection box, 20- main frame, 21- right movable plate, 22- right slide block, 23-left fixed plate, 24- horizontal push-pull component, 25- guide rail, 26- motor support, 27- rotating motor, 28- coupling, 29- left rotating shaft, 30- right rotating shaft, 31-bearing, 32- cleaning fluid nozzle, 33- conveyor belt, 34- conveyance driving motor, 35-die.

DETAILED DESCRIPTION

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

In order to further understand the content, features and functions of the disclosure, the following embodiments are given and illustrated with the attached drawings as follows.

Embodiment 1

Figure 1:
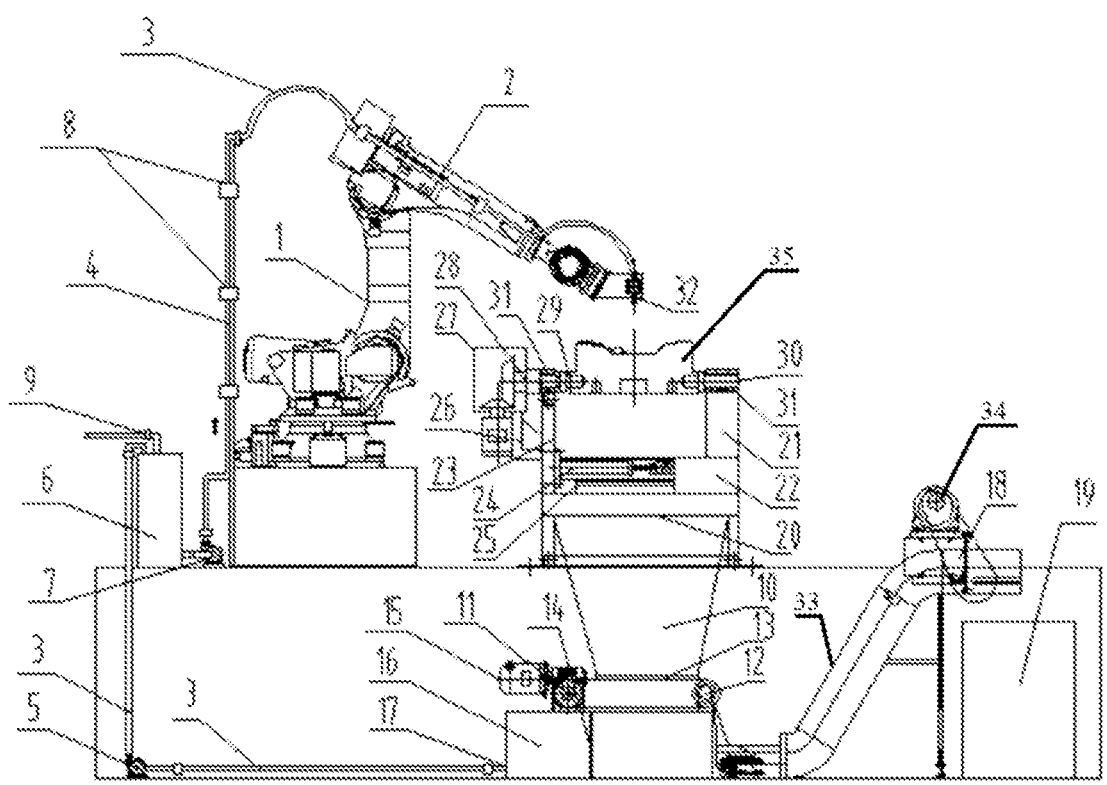
FIG. 1 is a structural schematic diagram of an automatic die cleaning device with reusable cleaning fluid according to the present disclosure.
Figure 2:
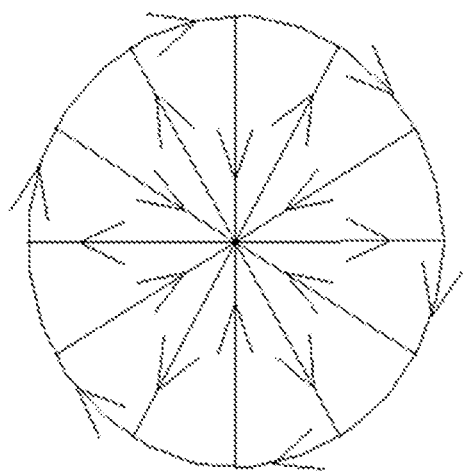
FIG. 2 is a first cleaning track of an automatic die cleaning device with reusable cleaning fluid according to the present disclosure.
Figure 3:
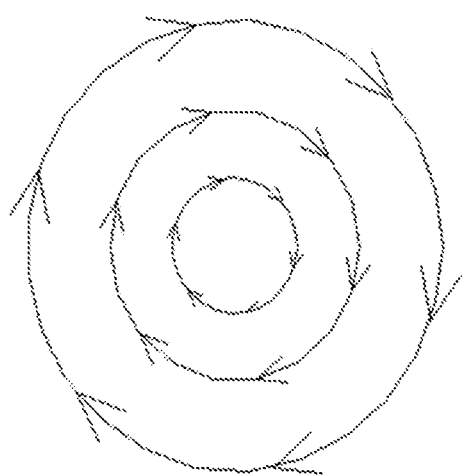
FIG. 3 is a second cleaning track of an automatic die cleaning device with reusable cleaning fluid according to the present disclosure.

Embodiment 1 of the present disclosure will be described below in conjunction with FIGS. 1-3 of the specification:

An automatic die cleaning device comprises a robot 1, a cleaning fluid cyclic-spraying system and a die overturning mechanism, the robot 1 comprises a robot arm 2, the motion track of the robot arm 2 can be controlled by programming, such as a FANUC M-710IC/50 industrial robot, and the robot 1 is arranged on the ground and positioned on one side of the die overturning mechanism.

The cleaning fluid cyclic-spraying system comprises a cleaning fluid nozzle 32, a cleaning fluid delivery system, a cleaning fluid collection device and a cleaning fluid filtration device, wherein the cleaning fluid nozzle 32 is a V-shaped nozzle which is fixed to the front end of the robot arm 2 through two clamps 8, the cleaning fluid nozzle 32 is fixed at the front end of the robot arm 2 and moves along with the movement of the robot arm 2, the cleaning fluid collection device and the cleaning fluid filtration device are arranged below the die, the cleaning fluid for flushing the die is collected by the cleaning fluid collection device and filtered by the cleaning fluid filtration device and then is re-conveyed to the cleaning fluid nozzle 32 through the cleaning fluid delivery system to be sprayed onto the surface of the die, and the surface of the die is cleaned by the high-pressure hot cleaning fluid sprayed from the nozzle, so as to achieve the purpose of cleaning the surface of the die completely. The robot arm 2 has two common motion tracks: as shown in FIG. 3, the robot arm 2 drives the cleaning fluid nozzle 32 to move outwards from the center of the die circle by circle, the motion track is multiple concentric circles, and the radii of the circles from inside to outside gradually increase; or as shown in FIG. 2, the robot arm 2 drives the cleaning fluid nozzle 32 to clean the die along the pitch radius of the die from the circle center to the edge, and then from the edge to the circle center a certain equal angle away, the circle is divided into N regions, the equal angle is 360°/N, and N is a positive integer greater than or equal to 2.

The cleaning fluid collection device comprises a collection funnel 10, the upper end of the collection funnel 10 is positioned below the die 35, the lower end of the collection funnel 10 is positioned on the cleaning fluid filtration device, and the upper end of the collection funnel 10 has a large diameter and the lower end has a small diameter. The cleaning fluid filtration device comprises a driving roller 11, a driven roller 12, a steel wire screen 13, a deceleration motor 15, a cleaning fluid collection box 16, a filter screen 14, a dirt lifting device 18 and a dirt collection box 19, wherein the cleaning fluid collection box 16 is positioned below the cleaning fluid collection device, and the upper surface of the cleaning fluid collection box 16 is fixedly provided with the deceleration motor 15, the driving roller 11 and the driven roller 12; the driving roller 11 and the driven roller 12 are respectively positioned on the left and right sides of the lower end of the cleaning fluid collection device, the driving roller 11 is connected with an output shaft of the deceleration motor 15, and a circle of steel wire screen 13 is wound around the driving roller 11 and the driven roller 12; and the driving roller 11 drives the driven roller 12 to rotate through the steel wire screen 13, the area of the upper-layer steel wire screen 13 is larger than the area of a lower-end opening of the cleaning fluid collection device, and the lower end of the cleaning fluid collection box 16 is provided with an outlet 17 which is connected with the cleaning fluid delivery pipeline 3. The filter screen 14 is positioned at the side, close to the outlet 17, in the cleaning fluid collection box 16 and is positioned outside the region of the lower-end opening of the cleaning fluid collection device. The driven roller 12 is close to the edge of one side of the cleaning fluid collection box 16, and the dirt lifting device 18 and the dirt collection box 19 are arranged outside the side, provided with the driven roller 12, of the cleaning fluid collection box 16; and the dirt lifting device 18 comprises a conveyor belt 33, a conveyance driving motor 34, a belt, a driving wheel and a plurality of driven wheels, one end of the conveyor belt 33 is positioned below the part, positioned outside the cleaning fluid collection box 16, of the driven roller 12, the other end of the conveyor belt 33 is positioned at the upper end of the dirt collection box 19, and the dirt collection box 19 is placed under the right side of the dirt lifting device to collect dirt. The driving wheel is arranged in the end, located at the upper end of the dirt collection box 19, of the conveyor belt 33, and the plurality of driven wheels are arranged in the conveyor belt 33; and the conveyance driving motor 34 drives the driving wheel to rotate through the belt, the driving wheel drives the conveyor belt 33 to move and drives the driven wheels to rotate, and dirt filtered out on the steel wire screen 13 is conveyed into the dirt collection box 19 through the conveyor belt 33. In this way, large or small pieces of dirt cleaned off from the die 35 are scraped down to the lower end of the dirt lifting device 18 along the steel wire screen 13, and the large or small pieces of dirt are collected into the dirt collection box 19 by the dirt lifting device 18. The cleaning fluid filtered by the steel wire screen 13 and the filter screen 14 is conveyed into the input port of the cleaning fluid heating device 6 through the cleaning fluid delivery pipeline 3 and the first high-pressure water pump 5 for reuse. During the cleaning process, the cleaning fluid supply pipeline 9 replenishes the cleaning fluid heating device 6 with cleaning fluid that is lost in use and continuously supplies the cleaning fluid to the cleaning fluid delivery system. Since the cleaning fluid is consumed in the cleaning process, supply input is added here to ensure that the amount of cleaning fluid is sufficient and the cleaning effect is stable. In addition, the device is divided into a ground part and a trench part, the second high-pressure water pump 7, the cleaning fluid heating device 6, the pipeline support 4, the robot 1 and the die overturning mechanism are all arranged on the ground, and the first high-pressure water pump 5, the cleaning fluid collection device and the cleaning fluid filtration device are all arranged in the trench.

The cleaning fluid collection device comprises a collection funnel 10, the upper end of the collection funnel 10 is positioned below the die, the lower end of the collection funnel 10 is positioned on the cleaning fluid filtration device, and the upper end of the collection funnel 10 has a large diameter and the lower end has a small diameter. The cleaning fluid filtration device comprises a driving roller 11, a driven roller 12, a steel wire screen 13, a deceleration motor 15, a cleaning fluid collection box 16, a filter screen 14, a dirt lifting device 18 and a dirt collection box 19, wherein the cleaning fluid collection box 16 is positioned below the cleaning fluid collection device, and the upper surface of the cleaning fluid collection box 16 is fixedly provided with the deceleration motor 15, the driving roller 11 and the driven roller 12; the driving roller 11 and the driven roller 12 are respectively positioned on the left and right sides of the lower end of the cleaning fluid collection device, the driving roller 11 is connected with an output shaft of the deceleration motor 15, and a circle of steel wire screen 13 is wound around the driving roller 11 and the driven roller 12; and the driving roller 11 drives the driven roller 12 to rotate through the steel wire screen 13, the area of the upper-layer steel wire screen 13 is larger than the area of a lower-end opening of the cleaning fluid collection device, and the lower end of the cleaning fluid collection box 16 is provided with an outlet 17 which is connected with the cleaning fluid delivery pipeline 3. The filter screen 14 is positioned at the side, close to the outlet 17, in the cleaning fluid collection box 16 and is positioned outside the region of the lower-end opening of the cleaning fluid collection device. The driven roller 12 is close to the edge of one side of the cleaning fluid collection box 16, and the dirt lifting device 18 and the dirt collection box 19 are arranged outside the side, provided with the driven roller 12, of the cleaning fluid collection box 16; and the dirt lifting device 18 comprises a conveyor belt, a conveyance driving motor, a belt, a driving wheel and a plurality of driven wheels, one end of the conveyor belt is positioned below the part, positioned outside the cleaning fluid collection box 16, of the driven roller 12, the other end of the conveyor belt is positioned at the upper end of the dirt collection box 19, and the dirt collection box 19 is placed under the right side of the dirt lifting device to collect dirt. The driving wheel is arranged in the end, located at the upper end of the dirt collection box 19, of the conveyor belt, and the plurality of driven wheels are arranged in the conveyor belt; and the conveyance driving motor drives the driving wheel to rotate through the belt, the driving wheel drives the conveyor belt to move and drives the driven wheels to rotate, and dirt filtered out on the steel wire screen 13 is conveyed into the dirt collection box 19 through the conveyor belt. In this way, large or small pieces of dirt cleaned off from the die are scraped down to the lower end of the dirt lifting device 18 along the steel wire screen 13, and the large or small pieces of dirt are collected into the dirt collection box 19 by the dirt lifting device 18. The cleaning fluid filtered by the steel wire screen 13 and the filter screen 14 is conveyed into the input port of the cleaning fluid heating device 6 through the cleaning fluid delivery pipeline 3 and the first high-pressure water pump 5 for reuse. During the cleaning process, the cleaning fluid supply pipeline 9 replenishes the cleaning fluid heating device 6 with cleaning fluid that is lost in use and continuously supplies the cleaning fluid to the cleaning fluid delivery system. Since the cleaning fluid is consumed in the cleaning process, supply input is added here to ensure that the amount of cleaning fluid is sufficient and the cleaning effect is stable. In addition, the device is divided into a ground part and a trench part, the second high-pressure water pump 7, the cleaning fluid heating device 6, the pipeline support 4, the robot 1 and the die overturning mechanism are all arranged on the ground, and the first high-pressure water pump 5, the cleaning fluid collection device and the cleaning fluid filtration device are all arranged in the trench.

The die overturning mechanism is positioned on the cleaning fluid collection device, the die is fixed on the die overturning mechanism, and the die overturning mechanism can drive the die to be freely overturned by 360° and fix the die with the top surface or the bottom surface facing upwards. The die overturning mechanism comprises a main frame 20, a right movable plate 21, a right slide block 22, a left fixed plate 23, a horizontal push-pull component 24, a guide rail 25, a motor support 26, a rotating motor 27, a speed reducer, a coupling 28, a left rotating shaft 29, a right rotating shaft 30 and bearings 31, wherein the main frame 20 is fixed on the ground, the upper end of the main frame 20 has no top surface, and the left fixed plate 23 is fixed to the left side of the main frame 20; the guide rail 25 perpendicular to the left fixed plate 23 is fixedly arranged on the main frame 20, the bottom of the left fixed plate 23 is also fixedly provided with the horizontal push-pull component 24 parallel to the guide rail 25, the horizontal push-pull component 24 may be an air cylinder, a hydraulic cylinder or an electric cylinder, one end of the horizontal push-pull component 24 is fixed to the left fixed plate 23, and the other end of the horizontal push-pull component 24 is fixed to the right slide block 22; the right slide block 22 can freely slide along the guide rail 25 under the push-pull action of the horizontal push-pull component 24, the right movable plate 21 parallel to the left fixed plate 23 is fixedly arranged on the right slide block 22, and the right movable plate 21 can move left and right along with the right slide block 22; the motor support 26 is arranged on the outer side face of the left fixed plate 23, the rotating motor 27 is fixed to the motor support 26, and an output shaft of the rotating motor 27 is connected with the speed reducer; the speed reducer is connected with the coupling 28, and the coupling 28 is connected with the left rotating shaft 29; the left fixed plate 23 is provided with a left through hole in the position corresponding to the left rotating shaft 29, a bearing 31 is fixedly arranged in the left through hole, and the left rotating shaft 29 passes through the left fixed plate 23 and is fixed to an inner ring of the bearing 31; and the right movable plate 21 is provided with a right through hole in the position corresponding to the left through hole, a bearing 31 is also fixedly arranged in the right through hole, and the right rotating shaft 30 passes through the right movable plate 21 and is fixed to an inner ring of the bearing 31. The left rotating shaft 29 is inserted into a left hole in the die, and the right rotating shaft 30 is inserted into a right hole in the die. In addition, the right slide block 22 can freely slide along the guide rail 25 under the push-pull action of the horizontal push-pull component 24, and can clamp wheel dies of different sizes according to sliding distances, so that the left rotating shaft 29 and the right rotating shaft 30 can clamp different dies for realizing cleaning of dies of different sizes.

In addition, a common cleaning fluid electric heater serves as the cleaning fluid heating device 6, such as a pipeline electric heater, to be specific, an electric heating rod is arranged in the pipeline to heat the cleaning fluid in the pipeline; or a water tank type electric heater, to be specific, a water tank is arranged on the flow path of the cleaning fluid, and an electric heating rod is arranged in the water tank to heat the cleaning fluid flowing into the water tank. The cleaning fluid heating device is a common device for those skilled in the art and will not be described in detail here. The cleaning fluid in this embodiment is prepared by diluting a common oil stain cleaning agent with an appropriate amount of clear water, and the cleaning agent can be selected from common oil stain cleaning agents, such as low-foam oil stain cleaning agents or heavy oil stain cleaning agents.

In actual use, the left rotating shaft 29 is inserted into the left hole in the die, and the right hole in the die is aligned with the right rotating shaft 30. The right end of the horizontal push-pull component 24 drives the right slide block 22 and a right movable frame thereon to slide leftward on the guide rail 25. The right rotating shaft 30 is inserted into the right hole in the die, and the left rotating shaft 29 and the right rotating shaft 30 clamp the die in the axial direction under the action of the clamping force of the right end of the horizontal push-pull component 24. By means of the speed reducer and the coupling 28, the rotation of a main shaft of the rotating motor 27 can realize the rotation of the left rotating shaft 29, so as to drive the clamped die to rotate. The robot arm 2 drives the cleaning fluid nozzle 32 to move according to a set track, and the die rotates in the positive and negative directions or by 360°, so that surface cleaning of the front surface, the back surface or other positions of the die is realized through high-pressure jetting. According to the characteristic that the head walking track of the robot arm 2 can be programmed, the walking route map of the cleaning fluid nozzle 32 on the head of the robot arm 2 on the surface of the die is set: as shown in FIG. 3, the robot arm 2 drives the cleaning fluid nozzle 32 to move outwards from the center of the die circle by circle, the motion track is multiple concentric circles, and the radii of the circles from inside to outside gradually increase; or as shown in FIG. 2, the robot arm 2 drives the cleaning fluid nozzle 32 to clean the die along the pitch radius of the die from the circle center to the edge, and then from the edge to the circle center a certain equal angle away, the circle is divided into 12 regions, the equal angle is 360°/12=30°. The deceleration motor 15 is connected with the driving roller 11 and drives the steel wire screen 13 to perform cyclic motion clockwise by means of the driven roller 12, and the cleaning fluid filtered by the steel wire screen 13 directly falls into the cleaning fluid collection box 16; meanwhile, large or small pieces of dirt cleaned off from the die are scraped down to the lower end of the dirt lifting device 18 along the steel wire screen 13 of the cleaning fluid filtration device, and the large or small pieces of dirt are collected into the dirt collection box 19 by the dirt lifting device 18. The cleaning fluid filtered by the steel wire screen 13 and the filter screen 14 is conveyed into the input port of the cleaning fluid heating device 6 through the cleaning fluid delivery pipeline 3 and the first high-pressure water pump 5 for reuse. During the cleaning process, the cleaning fluid supply pipeline 9 replenishes the cleaning fluid heating device 6 with cleaning fluid that is lost in use and continuously supplies the cleaning fluid to the cleaning fluid delivery system.

It is thus clear that the disclosure provides an automatic die cleaning device with reusable cleaning fluid. The automatic die cleaning device with reusable cleaning fluid comprises a robot, a cleaning fluid cyclic-spraying system and a die overturning mechanism. The automatic die cleaning device can spray the cleaning fluid to a die to clean oil stains off the surface of the wheel die, thus realizing the function of automatically cleaning the oil stains off the surface of the die; and the automatic die cleaning device also has the function of reusing the cleaning fluid, thereby saving the cleaning fluid and reducing the influence on the environment. The cleaned die surface is smooth, and the effect is ideal. The automatic die cleaning device reduces the labor intensity, meets the requirement of high-efficiency production, and improves the production efficiency.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

What is claimed is:
1. An automatic die cleaning device, comprising a robot, a cleaning fluid cyclic-spraying system and a die overturning mechanism, wherein:
   the robot comprises a robot arm, and motion track of the robot arm can be controlled by programming;
   the cleaning fluid cyclic-spraying system comprises a cleaning fluid nozzle, a cleaning fluid delivery system, a cleaning fluid collection device and a cleaning fluid filtration device, wherein the cleaning fluid nozzle is fixed at a front end of the robot arm and moves along with movement of the robot arm, the cleaning fluid collection device and the cleaning fluid filtration device are arranged below a die to be cleaned, and cleaning fluid for flushing the die is collected by the cleaning fluid collection device and filtered by the cleaning fluid filtration device and then is re-conveyed to the cleaning fluid nozzle through the cleaning fluid delivery system to be sprayed onto a surface of the die; and the die overturning mechanism is positioned on the cleaning fluid collection device, the die is fixed on the die overturning mechanism, and the die overturning mechanism can drive the die to rotate and fix the die with a top surface or a bottom surface facing upwards, the die overturning mechanism includes a main frame, a right movable plate, a right slide block, a left fixed plate, a horizontal push-pull component, a guide rail, a motor support, a rotating motor, a coupling, a left rotating shaft, a right rotating shaft and bearings, wherein the main frame is fixed on the ground, an upper end of the main frame has no top surface and is thus open, and the left fixed plate is fixed to a left side of the main frame; the guide rail perpendicular to the left fixed plate is fixedly arranged on the main frame, a bottom of the left fixed plate is also fixedly provided with the horizontal push-pull component parallel to the guide rail, one end of the horizontal push-pull component is fixed to the left fixed plate, and another end of the horizontal push-pull component is fixed to the right slide block; the right slide block can slide along the guide rail under push-pull action of the horizontal push-pull component, the right movable plate parallel to the left fixed plate is fixedly arranged on the right slide block, and the right movable plate can move left and right along with the right slide block; the motor support is arranged on an outer side face of the left fixed plate, the rotating motor is fixed to the motor support, and an output shaft of the rotating motor drives the left rotating shaft via the coupling; the left fixed plate is provided with a left through hole in a position corresponding to the left rotating shaft, a first bearing is fixedly arranged in the left through hole, and the left rotating shaft passes through the left fixed plate and is fixed to an inner ring of the first bearing; and the right movable plate is provided with a right through hole in a position corresponding to the left through hole, a second bearing is fixedly arranged in the right through hole, and the right rotating shaft passes through the right movable plate and is fixed to an inner ring of the second bearing, in operation, the left rotating shaft is inserted into a left hole in the die, and the right rotating shaft is inserted into a right hole in the die, the right slide block slides along the guide rail under the push-pull action of the horizontal push-pull component, so that the left rotating shaft and the right rotating shaft clamp the die, the rotating motor drives the left rotating shaft to rotate, so as to drive the die to rotate.

2. The automatic die cleaning device according to claim 1, wherein: the robot arm drives the cleaning fluid nozzle to move outwards from a center of the die circle by circle, the motion track is multiple concentric circles, and the radii of the circles from inside to outside gradually increase; or the robot arm drives the cleaning fluid nozzle to clean the die along a radius of the die from a circle center to an edge, and then from the edge to the circle center a certain equal angle away, the circle is divided into N areas, the equal angle is 360°/N, and N is a positive integer greater than or equal to 2.

3. The automatic die cleaning device according to claim 1, wherein: the cleaning fluid delivery system comprises a cleaning fluid delivery pipeline, a pipeline support, a first high-pressure water pump, a cleaning fluid heating device, a second high-pressure water pump and a plurality of clamps, wherein the cleaning fluid filtration device is connected with the first high-pressure water pump through the cleaning fluid delivery pipeline, and the first high-pressure water pump is connected with an input port of the cleaning fluid heating device through the cleaning fluid delivery pipeline; and an output port of the cleaning fluid heating device is connected with the second high-pressure water pump through the cleaning fluid delivery pipeline, the second high-pressure water pump is connected with the cleaning fluid nozzle through the cleaning fluid delivery pipeline, and the cleaning fluid delivery pipeline is fixed to the pipeline support and the robot arm through the plurality of clamps.

4. The automatic die cleaning device according to claim 3, wherein: the cleaning fluid heating device is further provided with a second input port, and the second input port is connected with a cleaning fluid supply pipeline which continuously supplies the cleaning fluid to the cleaning fluid delivery system.

5. The automatic die cleaning device according to claim 3, wherein: the cleaning fluid collection device comprises a collection funnel, an upper end of the collection funnel is positioned below the die, a lower end of the collection funnel is positioned on the cleaning fluid filtration device, and the diameter of the upper end of the collection funnel is larger than the diameter of the lower end of the collection funnel.

6. The automatic die cleaning device according to claim 5, wherein: the cleaning fluid filtration device comprises a driving roller, a driven roller, a steel wire screen, a deceleration motor and a cleaning fluid collection box, wherein the cleaning fluid collection box is positioned below the cleaning fluid collection device, and an upper surface of the cleaning fluid collection box is fixedly provided with the deceleration motor, the driving roller and the driven roller; the driving roller and the driven roller are respectively positioned on left and right sides of a lower end of the cleaning fluid collection device, the driving roller is connected with an output shaft of the deceleration motor, and the steel wire screen is wound around the driving roller and the driven roller; and the driving roller drives the driven roller to rotate through the steel wire screen, the area of an upper-layer steel wire screen is larger than the area of a lower-end opening of the cleaning fluid collection device, and a lower end of the cleaning fluid collection box is provided with an outlet which is connected with the cleaning fluid delivery pipeline.

7. The automatic die cleaning device according to claim 6, wherein: the cleaning fluid filtration device further comprises a dirt lifting device and a dirt collection box, the driven roller is close to an edge of a first side of the cleaning fluid collection box, and the dirt lifting device and the dirt collection box are arranged outside the first side, of the cleaning fluid collection box; the dirt lifting device comprises a conveyor belt and a conveyance driving motor, one end of the conveyor belt is positioned below the driven roller, outside the cleaning fluid collection box, and another end of the conveyor belt is positioned at an upper end of the dirt collection box; and the conveyance driving motor drives the conveyor belt to move, and dirt filtered out on the steel wire screen is conveyed into the dirt collection box through the conveyor belt.

8. The automatic die cleaning device according to claim 6, wherein: a filter screen is further arranged in the cleaning fluid collection box, and the filter screen is positioned at a side, close to the outlet, in the cleaning fluid collection box and is positioned outside a region of a lower-end opening of the cleaning fluid collection device.

9. The automatic die cleaning device according to claim 6, wherein: the cleaning fluid filtration device further comprises a dirt lifting device and a dirt collection box, the driven roller is close to an edge of a first side of the cleaning fluid collection box, and the dirt lifting device and the dirt collection box are arranged outside the first side of the cleaning fluid collection box; the dirt lifting device comprises a conveyor belt, a conveyance driving motor, one end of the conveyor belt is positioned below the driven roller, outside the cleaning fluid collection box, and another end of the conveyor belt is positioned at an upper end of the dirt collection box; and the conveyance driving motor drives the conveyor belt to move, and dirt filtered out on the steel wire screen is conveyed into the dirt collection box through the conveyor belt.

* * * * *